United States Patent [19]

Coiner

[11] 3,890,013
[45] June 17, 1975

[54] ELECTRICALLY CONTROLLED FLUID PRESSURE SYSTEM FOR CONVERTING DIGITAL CONTROL SIGNALS TO ANALOG SIGNALS

[75] Inventor: Ronald W. Coiner, Irwin, Pa.

[73] Assignee: Westinghouse Air Brake Company, Wilmerding, Pa.

[22] Filed: Jan. 28, 1974

[21] Appl. No.: 436,851

[52] U.S. Cl. ............ 303/20; 303/21 BE; 303/22 A
[51] Int. Cl. .................................. B60t 13/68
[58] Field of Search ................. 303/15–17, 303/20, 21 F, 21 BE, 21 CE, 22 A, 57, 59

[56] References Cited
UNITED STATES PATENTS

| | | |
|---|---|---|
| 3,432,210 | 3/1969 | Crouch .......................... 303/20 X |
| 3,778,813 | 12/1973 | Bull ............................... 303/20 X |
| 3,799,623 | 3/1974 | Wickham et al ................. 303/20 |

Primary Examiner—Duane A. Reger
Attorney, Agent, or Firm—R. W. McIntire, Jr.

[57] ABSTRACT

An electrically controlled fluid pressure system for converting a digital fluid pressure control signal to an analog signal which controls operation of fluid pressure operable brake apparatus. Flow of digital control fluid pressure is directed from a single restrictor to a plurality of parallel connected restrictors through which flow to atmosphere is individually controlled thereby determining the degree of the analog fluid pressure control signal monitored between the single restrictor and the plurality of restrictors by the number of the plurality of restrictors open to atmosphere at any given time.

12 Claims, 3 Drawing Figures

ELECTRICALLY CONTROLLED FLUID PRESSURE SYSTEM FOR CONVERTING DIGITAL CONTROL SIGNALS TO ANALOG SIGNALS

BACKGROUND OF THE INVENTION

Quick response and accurate control of operation is difficult to attain in fluid pressure operable brake systems using fluid pressure operated and controlled valve devices exclusively throughout the system. This is primarily due to the necessity of fluid pressure having to flow through a continuous pipe extending from car to car throughout the train. In one type of pneumatic brake system, for example, lapping of the master controller at the selected pressure relies on the trainline pressure feedback signal, which must reach the lead car before the master controller is able to respond to such feedback signal. Under these conditions accurate control of the brakes may be difficult. This situation is further compounded by the fact that the operator is required to manually operate the master controller to a selected position to effect the desired degree of brake operation. The selected position is determined by the operator's judgment. If the operator is relatively inexperienced, his judgment in selecting the handle position of the master controller may reflect such inexperience and, therefore, the resulting operation may also be inaccurate. Moreover, with the type of equipment above described, even if the operator is greatly experienced and highly skilled in operating the equipment, there is no positive assurance that the resulting operation will be highly accurate.

SUMMARY OF THE INVENTION

The object of the present invention, therefore, is to provide apparatus for supplying control fluid at a precise, measured pressure, said apparatus being characterized in that it may be operated without the necessity of judgment on the part of the operator in positioning an operating handle or lever.

Briefly, the invention comprises an upstream restrictor, through which control fluid at a constant preselected pressure is supplied, connected to a plurality of downstream restrictors which are connected in parallel relation to each other and are of preselected flow capacity. Control pressure is tapped off between the upstream restrictor and the plurality of downstream restrictors and directed to a relay valve device for controlling braking operations. Respective solenoids are provided for each of the downstream restrictors for selectively opening or closing any combination of said downstream restrictors to atmosphere, thereby controlling the degree of fluid pressure tapped off for the relay valve device. Actuation of the solenoids may be effected by using a binary code type controller.

The invention may also be provided with a quick release arrangement for effecting instantaneous reduction of control pressure in the tap-off line and, therefore, in the relay valve device. The invention may also be provided with means for providing braking operation by bypassing the solenoid controlled downstream restrictors in the event of electrical failure.

In the single sheet drawing.

DESCRIPTION AND OPERATION

Figure 1:
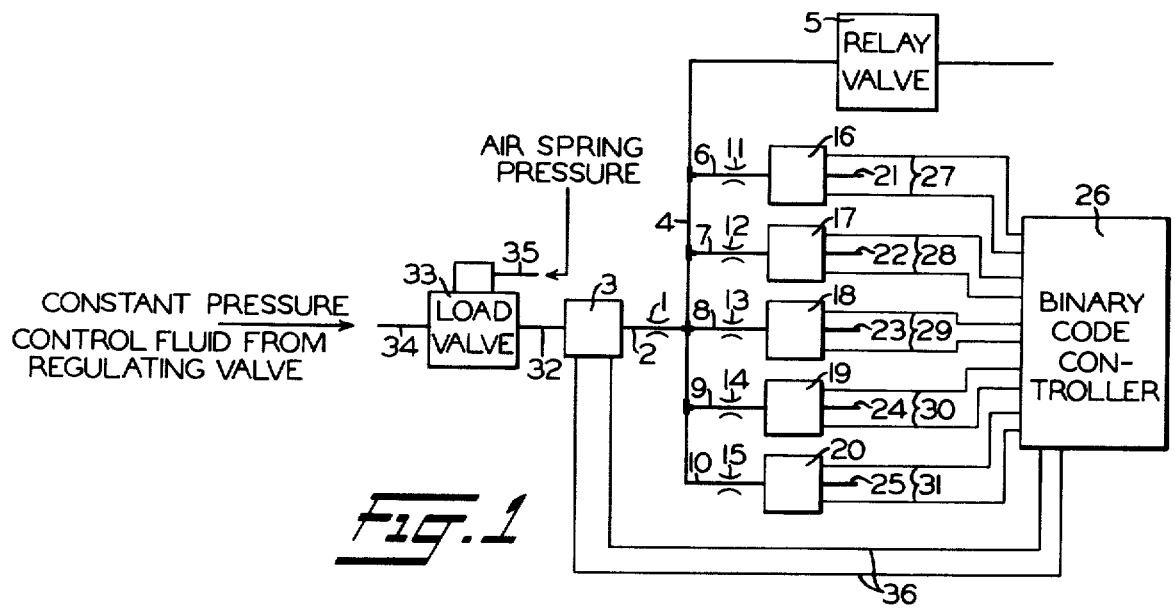
FIG. 1 is a schematic view, of a digital to analog converter system embodying the invention.

As shown in FIG. 1, the invention comprises an upstream restrictor 1 interposed in a conduit 2 connected at one end to an upstream solenoid valve device 3 and at the other end to a conduit 4 leading to a relay valve device 5 and connected via branch conduits 6, 7, 8, 9 and 10 to the upstream sides of restrictors 11, 12, 13, 14 and 15, respectively, interposed in said branch conduits. The downstream sides of restrictors 11, 12, 13, 14 and 15 are connected via the branch conduits 6, 7, 8, 9 and 10 to solenoid valve devices 16, 17, 18, 19 and 20, respectively, which are normally energized and in respective open positions to communicate said restrictors to atmosphere via atmospheric vents 21, 22, 23, 24 and 25, respectively, and, when deenergized, close off such communications.

Deenergization of solenoid valves 16, 17, 18, 19 and 20, which as above noted are normally energized, may be effected individually or in any combination thereof by any suitable control means such as a binary code type controller 26, for example, connected via electrical conductor means 27, 28, 29, 30 and 31, respectively, to said solenoid valves.

Although only five downstream restrictors are shown in the apparatus, the invention is not intended to be so limited. The intent, as will become clearer hereinafter, is to provide a sufficient number of downstream restrictors controllable in accordance with a digital binary code as to obtain the necessary discrete steps of brake control required to produce smooth transition from one pressure level to another with a minimum number of solenoid valves and restrictors. Thus, if the restrictors 11, 12, 13, 14 and 15 are all of different flow capacities, such arrangement will provide 31 control steps according to the formula $2^n-1$, where $n$ is the number of non-identical downstream restrictors.

A supply of control pressure is provided in a conduit 32 connected to the inlet side of solenoid valve device 3. Conduit 32 may be connected directly to a pressure regulating valve (not shown) which, in turn, is connected to a source of fluid pressure and adjusted for delivering fluid at a constant pressure compatible with the type of vehicle on which the brake equipment is mounted. If desired, however, and for more sophistocated braking action, a load valve device 33 may be interposed between pipe 32 and a conduit 34 connected to the regulating valve, said load valve device thus being interposed between said regulating valve and upstream solenoid valve 3.

Load valve device 33 is connected via a conduit 35 to air spring pressure reflecting the actual load condition of the vehicle. Load valve device 33 functions in conventional manner in effecting delivery of a control pressure to conduit 32 and, therefore, to restrictor 1 via solenoid valve 3 according to existing vehicle load. Upstream solenoid valve 3 is normally energized to a closed position in which control pressure in conduit 32 is cut off from upstream restrictor 1.

In order to effect a brake application, the binary code controller is operated to cause opening of electrical circuitry 36 connected to upstream solenoid valve 3 and, therefore, deenergization of said upstream solenoid valve, which is thereby operated to an open position in which control pressure from conduit 32 may flow to upstream restrictor 1 via conduit 2. Thus, control fluid at a pressure already determined by load valve device 33 flows via restrictor 1 to conduit 4 and relay valve 5 of a brake control valve (not shown) to initiate, in conventional manner, a brake application. If, at this point, all solenoid valves 16, 17, 18, 19 and 20 remained deenergized and closed, control fluid in conduit 4, unable to vent via vents 21, 22, 23, 24 and 25 will build up to a pressure corresponding to that prevailing on the inlet side of restrictor 1. This pressure also prevails at relay valve 5 to cause a maximum brake application compatible with the existing vehicle load. The flow rate of restrictor 1 is selected so as to provide flow of control pressure therethrough, at maximum vehicle load, sufficient for producing the highest desirable degree of braking under such conditions.

Control pressure supplied to conduit 4 via restrictor 1 and according to the existing vehicle load may be modified, however, if the maximum degree of braking is not deemed necessary. This may be effected by the operator in selecting a code on the code controller 26 which, in turn, energizes and opens those solenoid valves corresponding to the combination selected to open conduit 4 to atmosphere via the respective vents thus selected. Control pressure delivered to conduit 4 is thus reduced according to the combined flow capacities of the downstream restrictors connected to the energized solenoid valves. Such control pressure in conduit 4, as thus modified and delivered to relay valve 5, produces the desired brake application.

When it is desired to merely reduce the brake application in effect at any given time, the operator sets the code controller 26 to energize the appropriate combination of solenoid valves that provides the further desired reduction of pressure in conduit 4, and therefore at relay valve 5, to reduce brake application accordingly. If it is desired to release the brakes completely, the operator sets the code controller 26 to open all solenoid valves 16, 17, 18, 19 and 20 for effecting complete exhaust of control pressure in conduit 4 and relay valve 5 via vents 21, 22, 23, 24 and 25.

Figures 2, 3:
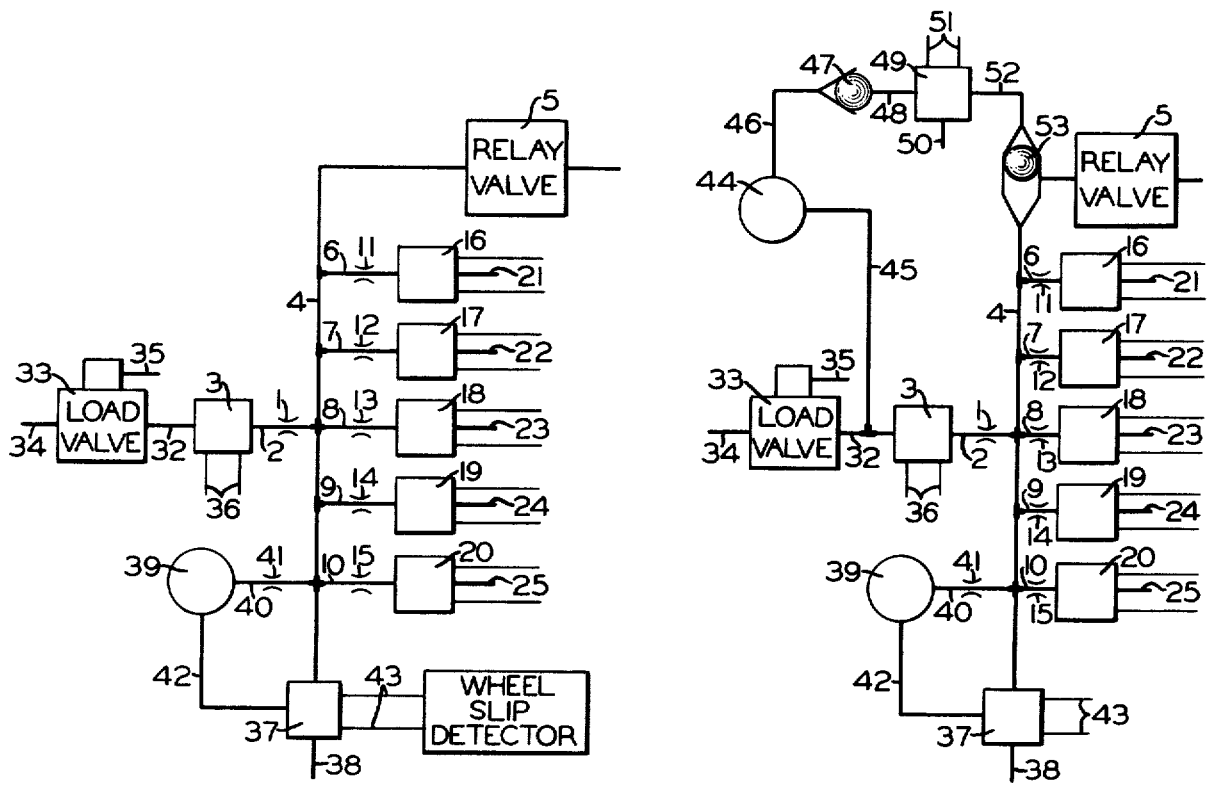
FIG. 2 is a schematic view of the system shown in FIG. 1 modified by the inclusion of quick release means.
FIG. 3 is a schematic view of the system, as shown in FIG. 2, further modified by the inclusion of fail-safe means.

The apparatus shown in FIG. 2 is basically similar to that shown in FIG. 1 and above described, except that means is provided for effecting a quick release of a brake application in response to a sudden change in dynamic braking or a wheel slip condition. A solenoid valve 37 having an atmospheric vent 38 is connected to conduit 4, said solenoid valve being normally deenergized and in a closed position in which conduit 4 is cut off from said atmospheric vent. Conduit 4 is also connected to a timing volume 39 via a branch conduit 40 in which a restrictor 41 is interposed and via which said volume is charged during such time that said solenoid valve is deenergized and closed. A pilot conduit 42 communicates volume 39 with solenoid valve 37. Thus, with solenoid valve 37 deenergized and volume 39, along with pilot conduit 42 fully charged at the prevailing pressure in conduit 4 corresponding to the degree of brake application in effect, said solenoid is conditioned to be actuated by pilot pressure in conduit 42, when said solenoid valve is energized via electrical conductor means 43 connected to a wheel-slip detector device illustrated symbolically in the drawing. In response to a wheel-slip condition or similar discrepancy, the wheel-slip detector, in well known manner, causes solenoid valve 37 to be energized and thereby operated to an open position in which conduit 4, and therefore relay valve 5, are immediately and unrestrictedly connected to atmosphere via vent 38 to provide a quick release of the prevailing brake application.

Notwithstanding that normal resumption of wheel rotation, which occurs almost instantaneously upon release of the brake application, causes the wheel-slip detector to effect immediate deenergization of solenoid valve 37, restoration of said solenoid valve to its said closed position is delayed due to the fact that the piloting pressure in conduit 42 must be dissipated via volume 39 and at a rate determined by restrictor 41. The delay thus imposed prevents an immediate untimely brake reapplication and possible recurrence of wheel-slip due thereto. When pilot pressure in conduit 42 is finally dissipated, solenoid valve 37 resumes its closed position, and pressure in conduit 4 and relay valve 5 may build up to the pressure prevailing therein prior to the quick release to restore the brake application at the level corresponding to the code in effect at the time the wheel-slip occurred. It should be evident that as long as the system is electrically energized, it will cycle automatically for correcting recurring wheel-slip.

The apparatus shown in FIG. 3 differs from that shown in FIG. 2 in that means bypassing the normal solenoid controlled restrictor network (restrictors 1, 11, 12, 13, 14 and 15, and solenoids 3, 16, 17, 18, 19 and 20) is provided whereby a brake application is assured in the event of malfunctioning of said solenoid valves, as will presently be explained.

It should be apparent that, in the event of electrical failure, the apparatus, as shown in FIGS. 1 and 2, would operate to automatically effect a brake application of maximum degree commensurate with the existing vehicle load at the time. Such action would occur because the normally energized and closed solenoid valve 3 would be deenergized by the electrical failure and cause the valve to be opened and thereby supply control fluid to conduit 4 (via restrictor 1) and relay valve 5. At the same time, the normally energized and open solenoid valves 16, 17, 18, 19 and 20 would also be deenergized and closed, and, therefore, pressure in conduit 4 and at relay valve 5, as above described, would build up to that established by the load valve device 33 to provide a maximum brake application for the existing vehicle load.

In the event of an electrical failure, there is no positive guarantee that one or any number of the solenoid valves 16, 17, 18, 19 and 20 would not stick in their open positions and thereby abort any possible brake application. For this reason, a fluid pressure volume 44 is connected via a conduit 45 to conduit 32 and charged therefrom. Volume 44 is connected via a conduit 46 to a one way check valve 47 which, in turn, is connected via a conduit 48 to the inlet side of an emergency solenoid valve 49 having an exhaust vent 50 and normally energized via conductor means 51. The direction of flow of check valve 47 is, as indicated, toward solenoid valve 49. The outlet side of solenoid valve 49 is connected via a conduit 52 to one side of a double check valve 53 interposed in conduit 4, the opposite side of said double check valve being connected to conduit 4. A delivery side of double check valve is connected to relay valve device 5.

In the normally energized position of solenoid valve 49, communication between conduits 48 and 52 is cut off whereas said conduit 52 is communicated to atmosphere via exhaust vent 50, in which case check valve 53 occupies a normal position in which flow through conduit 4 to relay valve 5 is uninterrupted.

In the event of electrical failure, a maximum brake application, as above described, would normally result. If some or all of the solenoid valves 16, 17, 18, 19 and 20 would inadvertently remain open, however, possibly an inadequate or no brake application at all would result with the systems shown in FIGS. 1 and 2. On the other hand, if an electrical failure occurs in the system shown in FIG. 3, solenoid valve 49 is deenergized and operates to an emergency position in which venting of conduit 52 via vent 50 is cut off and conduit 48 is placed in communication with said conduit 52, whereupon fluid pressure from volume 44 provides an immediate inshot pressure to relay valve 5 via one-way check valve 47 and solenoid valve 49. Since, as above assumed, some or all of vents 21, 22, 23, 24 and 25 are open, the pressure on the lower side of double check valve 53, as viewed in the drawing, is less than that on the upper side or in conduit 52, and thus said double check valve is shifted from the normal position shown to open communication from volume 44 to relay valve 5. A full service, load-weighed brake control signal is automatically provided in the event of electrical failure or malfunctioning of the solenoid valves of the normal control network.

Having now described the invention, what I claim as new and desire to secure by Letters Patent, is:

1. Apparatus for converting digital control pressure to analog control pressure to be transmitted to a vehicle brake control device operable responsively thereto, said apparatus comprising:
   a. a supply conduit pressurizable at a constant pressure and via which control fluid pressure may be supplied to the vehicle brake control device;
   b. a plurality of venting means connected to said supply conduit in parallel relation to each other; and
   c. operator controlled means for selectively effecting opening and closing said venting means, either singly or in any combination thereof, for establishing a desired analog control pressure in said supply conduit.

2. Apparatus for converting digital control pressure to analog control pressure, as set forth in claim 1, further characterized by a first restrictor interposed upstream in said supply conduit for restricting pressurization thereof to a predetermined maximum degree commensurate with the requirement of the control device to be operated thereby.

3. Apparatus for converting digital control pressure to analog control pressure, as set forth in claim 1, wherein said operator controlled means comprises a binary code controller.

4. Apparatus for converting digital control pressure to analog control pressure, as set forth in claim 2, wherein each of said venting means comprises:
   a. an atmospheric vent; and
   b. a valve device interposed between said supply conduit and said atmospheric vent and having a normally open position, in which said supply conduit is communicated to atmosphere, said valve device being selectively operable by said operator controlled means to a closed position in which said supply conduit is closed to atmosphere.

5. Apparatus for converting digital control pressure to analog control pressure, as set forth in claim 4, said operator controlled means comprises a binary code controller and each of said valve devices is a solenoid-operated valve device normally energized to occupy said open position and being selectively operable to said closed position when deenergized responsively to operation of said binary code controller.

6. Apparatus for converting digital control pressure to analog control pressure, as set forth in claim 4, further characterized by respective restrictors interposed between said supply conduit and each of said valve devices for restricting flow of fluid pressure from said supply conduit to atmosphere according to the rated flow capacity of the respective restrictor.

7. Apparatus for converting digital control pressure to analog control pressure, as set forth in claim 6, wherein the flow rate of each of said respective restrictors differs from that of the others.

8. Apparatus for converting digital control pressure to analog control pressure, as set forth in claim 7, further characterized by an upstream solenoid valve device interposed in said supply conduit upstream of said first restrictor, said upstream solenoid valve device normally occupying an energized closed position, in which said pressurization of said supply conduit is cut off, and being operable responsively to deenergization to an open position in which said pressurization is effected.

9. Apparatus for converting digital control pressure to analog control pressure, as set forth in claim 8, further characterized by a vehicle load responsive valve device interposed in said supply conduit upstream of said upstream solenoid valve device for modifying the constant pressure effected by said pressurization to a degree commensurate with the existing degree of vehicle load.

10. Apparatus for converting digital control pressure to analog control pressure, as set forth in claim 9, further characterized by a wheel-slip detector and quick release means connected to said supply conduit, said quick release means being operable responsively to a wheel slip signal transmitted thereto from the wheel-slip detector for effecting release of fluid pressure from the supply conduit to atmosphere at an unrestricted rate and restoration of fluid pressure in said supply conduit at a predetermined restricted rate.

11. Apparatus for converting digital control pressure to analog control pressure, as set forth in claim 10, further characterized by bypassing conduit means connected between said supply conduit and the vehicle brake control device in bypassing relation to said upstream solenoid valve and said first restrictor, and an emergency solenoid valve interposed in said bypassing conduit means, said emergency solenoid valve normally occupying an energized closed position, in which a bypassing communication through said bypassing conduit means is closed, and being operable in response to deenergization to an open position in which said bypassing communication is open.

12. Apparatus for converting digital control pressure to analog control pressure, as set forth in claim 11, further characterized by a double check valve device interposed between said bypassing conduit means and said supply conduit and having an outlet connected to the vehicle brake control device, said double check valve device being operable to a first position, when said bypassing communication is closed, to connect said supply conduit to said outlet, and to a second position, when said bypassing communication is open, to connect said bypassing conduit means to said outlet.

* * * * *